(12) United States Patent
Myers et al.

(10) Patent No.: US 12,214,538 B2
(45) Date of Patent: Feb. 4, 2025

(54) BLOW MOLDED CONTAINERS AND METHODS OF MAKING THE SAME

(71) Applicant: CSP TECHNOLOGIES, INC., Auburn, AL (US)

(72) Inventors: Kasey Myers, Auburn, AL (US); Jonathan R. Freedman, Auburn, AL (US)

(73) Assignee: CSP TECHNOLOGIES, INC., Auburn, AL (US)

( * ) Notice: Subject to any disclaimer, the term of this patent is extended or adjusted under 35 U.S.C. 154(b) by 0 days.

(21) Appl. No.: 15/733,780

(22) PCT Filed: Apr. 24, 2019

(86) PCT No.: PCT/US2019/028981
§ 371 (c)(1),
(2) Date: Oct. 23, 2020

(87) PCT Pub. No.: WO2019/209990
PCT Pub. Date: Oct. 31, 2019

(65) Prior Publication Data
US 2021/0245413 A1 Aug. 12, 2021

Related U.S. Application Data

(60) Provisional application No. 62/661,697, filed on Apr. 24, 2018.

(51) Int. Cl.
*B29C 49/00* (2006.01)
*B29C 49/22* (2006.01)
(Continued)

(52) U.S. Cl.
CPC .......... *B29C 49/0005* (2013.01); *B29C 49/22* (2013.01); *B65D 81/266* (2013.01);
(Continued)

(58) Field of Classification Search
CPC ........... B32B 1/02; B32B 27/18; B32B 27/20; B32B 27/205; B32B 27/32; B32B 27/327;
(Continued)

(56) References Cited

U.S. PATENT DOCUMENTS

| 5,911,937 A | 6/1999 | Hekal |
| 6,080,350 A | 6/2000 | Hekal |

(Continued)

FOREIGN PATENT DOCUMENTS

| CN | 101229508 A | 7/2008 |
| EP | 1092120 A1 | 4/2001 |

(Continued)

OTHER PUBLICATIONS

International Written Opinion and Search Rerport for PCT/US2019/028981, dated Sep. 10, 2019.

*Primary Examiner* — Yan Lan
(74) *Attorney, Agent, or Firm* — David B. Gornish; Eckert Seamans Cherin & Mellott, LLC

(57) ABSTRACT

A container, e.g., bottle, is formed by a blow molding process. The container includes a base and a sidewall extending from the base. The base and the sidewall define an interior configured to house at least one product. At least one of the sidewall and the base has a barrier layer and a desiccant layer attached to the barrier layer. The barrier layer and the desiccant layer are each blow molded together. The barrier layer is located external relative to the desiccant layer and is made of a plastic material. The desiccant layer is made of a monolithic composition comprising a mixture of a base polymer, a desiccant, and a channeling agent.

7 Claims, 5 Drawing Sheets

(51) Int. Cl.
*B65D 81/26* (2006.01)
*C08K 5/06* (2006.01)
*C08L 23/06* (2006.01)
*B29L 31/00* (2006.01)

(52) U.S. Cl.
CPC ............... *C08K 5/06* (2013.01); *C08L 23/06* (2013.01); *B29L 2031/7158* (2013.01); *C08L 2207/066* (2013.01)

(58) Field of Classification Search
CPC ...... B65D 1/02; B65D 1/0207; B65D 1/0215; B65D 81/24; B65D 81/26; B65D 81/266; B65D 81/267; B29L 2031/7158; B29C 49/0005; B29C 49/22; B29C 2049/001; C08K 5/06; C08L 23/06; C08L 2207/066
See application file for complete search history.

(56) References Cited

U.S. PATENT DOCUMENTS

| | | |
|---|---|---|
| 6,124,006 A | 9/2000 | Hekal |
| 6,130,263 A | 10/2000 | Hekal |
| 6,194,079 B1 | 2/2001 | Hekal |
| 6,214,255 B1 | 4/2001 | Hekal |
| 6,486,231 B1 | 11/2002 | Hekal |
| 7,005,459 B2 | 2/2006 | Hekal |
| 8,110,260 B2 * | 2/2012 | Merical ..................... B32B 5/18 428/36.5 |
| 2008/0185301 A1 * | 8/2008 | Merical ................ B65D 81/266 206/204 |
| 2014/0287174 A1 | 9/2014 | Klein et al. |
| 2016/0039955 A1 * | 2/2016 | Klein ................ B01J 20/28026 525/384 |
| 2019/0152199 A1 | 5/2019 | Yamazaki et al. |

FOREIGN PATENT DOCUMENTS

| | | |
|---|---|---|
| EP | 1421991 A2 | 5/2004 |
| EP | 1534350 A1 | 6/2005 |
| JP | 2000043948 A | 2/2000 |
| JP | 2005220149 A | 8/2005 |
| JP | 2015134342 A | 7/2015 |
| WO | 2008/097830 A1 | 8/2008 |
| WO | 2014/152539 A1 | 9/2014 |

* cited by examiner

BLOW MOLDED CONTAINERS AND METHODS OF MAKING THE SAME

CROSS-REFERENCE TO RELATED APPLICATIONS

This application is a U.S. National Phase of International Application No. PCT/US2019/028981 filed Apr. 24, 2019, which claims priority to U.S. Provisional Patent Application No. 62/661,697 filed Apr. 24, 2018, which are incorporated herein by reference in their entireties.

BACKGROUND OF THE INVENTION

1. Field of Invention

This invention relates to blow molded containers and methods of making the same.

2. Description of Related Art

There are many items that are preferably stored, shipped and/or utilized in an environment that must be controlled and/or regulated. For example, in the moisture control field, containers and/or packages having the ability to absorb excess moisture trapped therein have been recognized as desirable. The control of moisture, oxygen, ethylene and other gaseous substances may be desirable in medical, diagnostic, industrial chemical, laboratory, electronics and food packaging applications.

Conventionally, desiccants, oxygen absorbers and other active agents have been used in raw form, e.g., as loose particulates housed in sachets or canisters within packaging, to control the internal environment of the package. For many applications, it is not desired to have such loosely stored active substances. To address this problem, the assignee of the present application had developed active entrained polymers comprising active agents, wherein such polymers can be extruded and/or molded into desired forms, e.g., container liners, plugs, film sheets, pellets and other such structures. Optionally, such active entrained polymers may include channeling agents, such as polyethylene glycol (PEG), which form channels between the surface of the entrained polymer and its interior to transmit a selected material (e.g., moisture) to the entrained active agent (e.g., desiccant to absorb the moisture).

Entrained polymers may be two phase formulations (i.e., comprising a base polymer and active agent, without a channeling agent) or three phase formulations (i.e., comprising a base polymer, active agent and channeling agent). Three phase entrained polymers and methods for making the same are described, for example, in U.S. Pat. Nos. 5,911,937, 6,080,350, 6,124,006, 6,130,263, 6,194,079, 6,214,255, 6,486,231, 7,005,459, and U.S. Pat. Pub. No. 2016/0039955, each of which is incorporated herein by reference as if fully set forth. These entrained polymers have been conventionally made as injection molded components, for example as inserts or liners within containers.

It is desirable in some applications to store contents in a bottle, which is a container characterized by a comparatively narrow neck leading to an opening to dispense the contents held within. Bottles, unlike vials or other containers, are not typically made using standard injection molding. Rather, bottles are typically fabricated in a blow molding process. Blow molding involves inflating a hot, hollow thermoplastic parison within a mold cavity. The inflated thermoplastic material conforms to the shape of the mold cavity and cools/hardens to form an article (e.g., bottle) corresponding to the shape of the mold cavity. Types of blow molding include, for example, extrusion blow molding, injection blow molding and injection stretch blow molding.

Unlike injection molded containers, blow molded bottles cannot readily be fabricated with entrained desiccant polymer inserts. Rather, a desiccant entrained polymer layer(s) in a blow molded bottle must be a component of the blow mold parison, e.g., as a layer in an extruded composite used to form the parison. Including a desiccant material, which is typically a mineral component (e.g., molecular sieve or silica gel) affects the flow characteristics of the entrained polymer and can consequently present technical difficulties in the blow molding process. In addition, prior blow molded containers with desiccant layers do not provide the necessary moisture uptake and capacity needed to store contents requiring very low (approaching zero) relative humidity.

It is therefore desirable to provide an improved container, particularly a blow molded bottle, which provides advantages in terms of moisture absorption and capacity. The improved container would include an integral desiccant layer and thus ideally would not require a separate desiccant component (e.g., canister or sachet).

BRIEF SUMMARY OF THE INVENTION

Accordingly, in one aspect, a container formed by a blow molding process is provided. The container includes a base and a sidewall extending from the base. The base and the sidewall define an interior configured to house at least one product. At least one of the sidewall and the base has a barrier layer and a desiccant layer attached to the barrier layer. The barrier layer and the desiccant layer are each blow molded together, preferably as a coextruded composite. The barrier layer is located external relative to the desiccant layer and is made of a plastic material. The desiccant layer is made of a monolithic composition comprising a mixture of a base polymer, a desiccant, and a channeling agent.

Preferably, the container is in the form of a bottle. The bottle defines an interior volume for holding a moisture sensitive product. The bottle comprises a neck and a sidewall, the neck having a first cross sectional area and the sidewall having a second cross sectional area, the first cross sectional area being smaller than the second cross sectional area. In other words, the neck is narrower than remainder of the bottle in at least one dimension and is no less narrow than the remainder of the bottle in any dimension.

In any embodiment, the container retains its molded shape under gravity.

In an optional embodiment, a container defines an interior volume for holding a moisture-sensitive product. The container includes a neck and a sidewall, the neck defining a first cross sectional area and the sidewall defining a second cross sectional area. The first cross sectional area is smaller than the second cross sectional area. The container further includes at least an inner desiccant layer and an outer barrier layer. The inner and outer layers each have a thickness of at least 20 mils and are formed by a blow molding process preferably selected from the group consisting of coextrusion blow molding, coinjection blow molding and coinjection stretch blow molding. The inner layer comprises a polymeric material and at least 30 weight percent, preferably at least 35 weight percent of a desiccant material (optionally molecular sieve), the outer layer comprising a polymer moisture-barrier material, wherein the container retains its molded shape under gravity. Optionally, the container further includes an intermediate layer that includes a "regrind" of the materials from the inner wall and outer wall from other containers that had been made and then set aside for recycling.

Optionally, in any embodiment, the outer layer comprises, consists essentially of or consists of high density polyethylene (HDPE).

Optionally, in any embodiment, the outer layer comprises, consists essentially of or consists of low density polyethylene (LDPE).

Optionally, in any embodiment, the base polymer material of the inner layer comprises, consists essentially of or consists of LDPE.

In an optional embodiment, a method for making a container is provided. The method includes the steps of: adding a desiccant (optionally molecular sieve), a polymer and a channeling agent together to form a mixture; forming the container comprising a neck and a sidewall, the neck defining a first cross sectional area and the sidewall defining a second cross sectional area, the first cross sectional area being smaller than the second cross sectional area. The container further comprises an inner layer and an outer layer each having a thickness of at least 20 mils using a blow molding process preferably selected from the group consisting of coextrusion blow molding, coinjection blow molding and coinjection stretch blow molding. The inner layer comprises the mixture of at least 30 weight percent, preferably at least 35 weight percent of desiccant and polymeric material, and the outer layer comprises a barrier material made from a polymer, wherein the container retains its molded shape under gravity.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

Definitions

Figure 1:
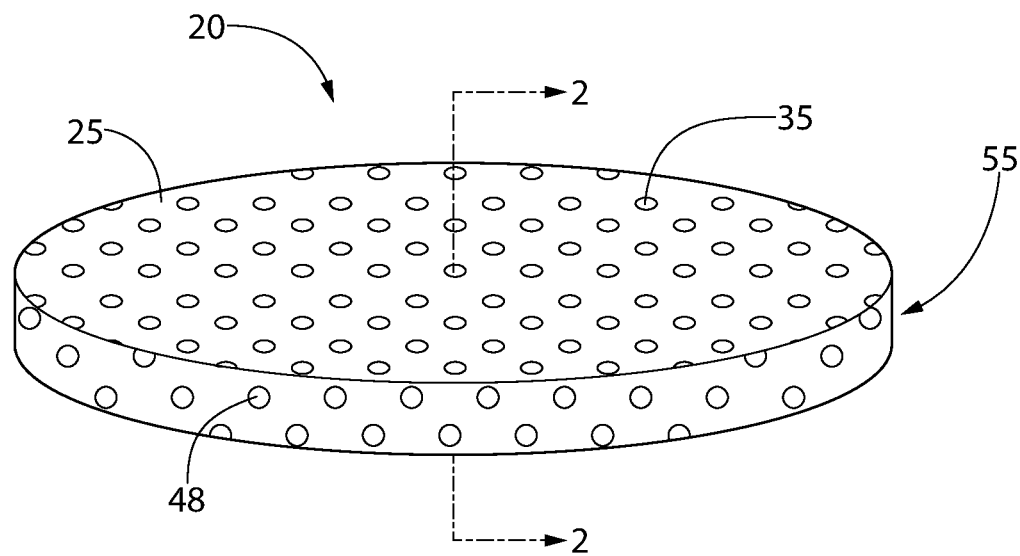
FIG. 1 is a schematic perspective view of a plug formed of an entrained polymer according to an optional embodiment of the present invention.

As used herein, the term "active" is defined as capable of acting on, interacting with or reacting with a selected material (e.g., moisture or oxygen) according to the invention. Examples of such actions or interactions may include absorption, adsorption or release of the selected material.

As used herein, the term "active agent" is defined as a material that (1) is immiscible with the base polymer and when mixed and heated with the base polymer and the channeling agent, will not melt, i.e., has a melting point that is higher than the melting point for either the base polymer or the channeling agent, and (2) acts on, interacts or reacts with a selected material. The term "active agent" may include but is not limited to materials that absorb, adsorb or release the selected material(s). Active agents according to the invention may be in the form of particles, preferably minerals, but the invention should generally not be viewed as limited only to particulate active agents (unless a respective claim recites otherwise).

As used herein, the term "base polymer" is a polymer optionally having a gas transmission rate of a selected material that is substantially lower than, lower than or substantially equivalent to, that of the channeling agent. By way of example, such a transmission rate would be a water vapor transmission rate in embodiments where the selected material is moisture and the active agent is a water absorbing desiccant. The primary function of the base polymer is to provide structure for the entrained polymer. Suitable base polymers may include thermoplastic polymers, e.g., polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof.

Referring to such a comparison of the base polymer and channeling agent water vapor transmission rate, in one embodiment, the channeling agent has a water vapor transmission rate of at least two times that of the base polymer. In another embodiment, the channeling agent has a water vapor transmission rate of at least five times that of the base polymer. In another embodiment, the channeling agent has a water vapor transmission rate of at least ten times that of the base polymer. In still another embodiment, the channeling agent has a water vapor transmission rate of at least twenty times that of the base polymer. In still another embodiment, the channeling agent has a water vapor transmission rate of at least fifty times that of the base polymer. In still another embodiment, the channeling agent has a water vapor transmission rate of at least one hundred times that of the base polymer.

As used herein, the term "channeling agent" or "channeling agents" is defined as a material that is immiscible with the base polymer and has an affinity to transport a gas phase substance at a faster rate than the base polymer. Optionally, a channeling agent is capable of forming channels through the entrained polymer when formed by mixing the channeling agent with the base polymer. Optionally, such channels are capable of transmitting a selected material through the entrained polymer at a faster rate than in solely the base polymer.

As used herein, the term "channels" or "interconnecting channels" is defined as passages formed of the channeling agent that penetrate through the base polymer and may be interconnected with each other.

As used herein, the term "entrained polymer" is defined as a monolithic material formed of at least a base polymer with an active agent and optionally also a channeling agent entrained or distributed throughout. An entrained polymer thus includes two-phase polymers and three phase polymers. A "mineral loaded polymer" is a type of entrained polymer, wherein the active agent is in the form of minerals, e.g., mineral particles such as molecular sieve or silica gel.

As used herein, the term "monolithic," "monolithic structure" or "monolithic composition" is defined as a composition or material that does not consist of two or more discrete macroscopic layers or portions. Accordingly, a "monolithic composition" does not include a multi-layer composite (although it may be part of a multi-layer composite).

As used herein, the term "phase" is defined as a portion or component of a monolithic structure or composition that is uniformly distributed throughout, to give the structure or composition it's monolithic characteristics.

As used herein, the term "selected material" is defined as a material that is acted upon by, or interacts or reacts with an active agent and is capable of being transmitted through the channels of an entrained polymer. For example, in embodiments in which a desiccant is used as an active agent, the selected material may be moisture or a gas that can be absorbed by the desiccant. In embodiments in which a releasing material is used as an active agent, the selected material may be an agent released by the releasing material, such as moisture, fragrance, or an antimicrobial agent. In embodiments in which an adsorbing material is used as an active agent, the selected material may be certain volatile organic compounds and the adsorbing material may be activated carbon.

As used herein, the term "three phase" is defined as a monolithic composition or structure comprising three or more phases. An example of a three phase composition according to the invention would be an entrained polymer formed of a base polymer, active agent, and channeling agent. Optionally, a three phase composition or structure may include an additional phase, e.g., a colorant (thus "three phase" indicates at least three phases, including a base polymer, active agent and channeling agent).

Exemplary Entrained Polymers

FIGS. 1-4 illustrate exemplary entrained polymers 10 and various packaging assemblies formed of entrained polymers according to the invention. The entrained polymers 10 each include a base polymer 25, a channeling agent 35 and an active agent 30. As shown, the channeling agent 35 forms interconnecting channels 45 through the entrained polymer 10. At least some of the active agent 30 is contained within these channels 45, such that the channels 45 communicate between the active agent 30 and the exterior of the entrained polymer 10 via channel openings 48 formed at outer surfaces of the entrained polymer 25. The active agent 30 can be, for example, any one of a variety of absorbing, adsorbing or releasing materials, as described in further detail below.

Suitable channeling agents may include a polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent 35 can be, for example, a water insoluble polymer, such as a propylene oxide polymerisate-monobutyl ether, such as Polyglykol B01/240, produced by CLARIANT. In other embodiments, the channeling agent could be a propylene oxide polymerisate monobutyl ether, such as Polyglykol B01/20, produced by CLARIANT, propylene oxide polymerisate, such as Polyglykol D01/240, produced by CLARIANT, ethylene vinyl acetate (EVA), nylon 6, nylon 66, or any combination of the foregoing.

Figure 4:
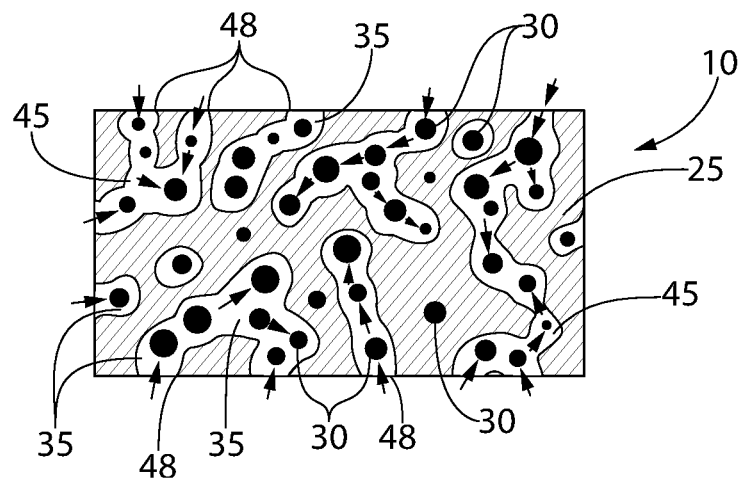
FIG. 4 is a schematic illustration of an entrained polymer according to an optional embodiment of the present invention, in which the active agent is an absorbing material, e.g., desiccant.

Suitable active agents according to the invention include absorbing materials, such as desiccating compounds. FIG. 4 illustrates an embodiment of an entrained polymer 10 according to the invention, in which the active agent 30 is an absorbing or adsorbing material. The arrows indicate the path of the selected material, for example moisture or gas, from an exterior of the entrained polymer 10, through the channels 45, to the particles of active agent 30, which absorb or adsorb the selected material.

If the active agent is a desiccant, any suitable desiccant for a given application may be used. Typically, physical absorption desiccants are preferred for many applications. These may include molecular sieves, silica gels, clays and starches. Alternatively, the desiccant may be a chemical compound that forms crystals containing water or compounds which react with water to form new compounds.

Optionally, in any embodiment, the active agent may be an oxygen scavenger.

Suitable absorbing materials may, in optional embodiments, also include: (1) metals and alloys such as, but not limited to, nickel, copper, aluminum, silicon, solder, silver, gold; (2) metal-plated particulates such as silver-plated copper, silver-placed nickel, silver-plated glass microspheres; (3) inorganics such as $BaTiO_3$, $SrTiO_3$, $SiO_2$, $Al_2O_3$, ZnO, $TiO_2$, MnO, CuO, $Sb_2O_3$, WC, fused silica, fumed silica, amorphous fused silica, sol-gel silica, sol-gel titanates, mixed titanates, ion exchange resins, lithium-containing ceramics, hollow glass microspheres; (4) carbon-based materials such as carbon, activated charcoal, carbon black, ketchem black, diamond powder; (5) elastomers, such as polybutadiene, polysiloxane, and semi-metals, ceramic and; (6) other fillers and pigments.

In another example, the absorbing material may be a carbon dioxide scavenger, such as calcium oxide. In the presence of moisture and carbon dioxide, the calcium oxide is converted to calcium carbonate. Accordingly, calcium oxide may be used as the absorbing material in applications where absorption of carbon dioxide is needed. Such applications include preserving fresh foods (e.g., fruits and vegetables) that give off carbon dioxide.

Other suitable active agents according to the invention include releasing materials. Such materials may comprise any suitable material that will release the selected material from the releasing material. The selected material released from the releasing material could be in the form of a solid, gel, liquid or gas. These substances can perform a variety of functions including: serving as a fragrance, flavor, or perfume source; supplying a biologically active ingredient such as pesticide, pest repellent, antimicrobials, bait, aromatic medicines, etc.; providing humidifying or desiccating substances; delivering air-borne active chemicals, such as corrosion inhibitors; ripening agents and odor-making agents.

Suitable biocides for use as releasing materials in the entrained polymers of the present invention may include, but are not limited to, pesticides, herbicides, nematacides, fungicides, rodenticides and/or mixtures thereof. In addition to the biocides, the covering of the present invention can also release nutrients, plant growth regulators, pheromones, defoliants and/or mixture thereof.

Quaternary ammonium compounds can also be used as releasing materials according to the invention. Such compounds not only function as surfactants, but also impart to the surface of the entrained polymer aseptic properties or establish conditions for reducing the number of microbial organisms, some of which can be pathogenic. Numerous other antimicrobial agents, such as benzalkonium chloride and related types of compounds as hexachlorophene, may also be used as releasing agents according to the invention. Other antimicrobial agents, such as chlorine dioxide releasing agents may be used.

Other potential releasing materials include fragrances, including natural, essential oils and synthetic perfumes, and blends thereof. Typical perfumery materials which may form part of, or possibly the whole of, the active ingredient include: natural essential oils such as lemon oil, mandarin oil, clove leaf oil, petitgrain oil, cedar wood oil, patchouli oil, lavandin oil, neroli oil, ylang oil, rose absolute or jasmin absolute; natural resins such as labdanum resin or olibanum resin; single perfumery chemicals which may be isolated from natural sources or manufactured synthetically, as for example alcohols such as geraniol, nerol, citronellol, linalol, tetrahydrogeraniol, betaphenylethyl alcohol, methyl phenyl carbinol, dimethyl benzyl carbinol, menthol or cedrol; acetates and other esters derived from such alcohols-aldehydes such as citral, citronellal, hydroxycitronellal, lauric aldehyde, undecylenic aldehyde, cinnamaldehyde, amyl cinnamic aldehyde, vanillin or heliotropin; acetals derived from such aldehydes; ketones such as methyl hexyl ketone, the ionones and methylionones; phenolic compounds such as eugenol and isoeugenol; synthetic musks such as musk xylene, musk ketone and ethylene brassylate.

It is believed that the higher the active agent concentration in the mixture, the greater the absorption, adsorption or releasing capacity (as the case may be) will be of the final composition. However, too high an active agent concentration could cause the entrained polymer to be more brittle and the molten mixture of active agent, base polymer and channeling agent to be more difficult to either thermally form, extrude or injection mold. In one embodiment, the active agent loading level can range from 10% to 80%, preferably 35% to 70%, more preferably from 40% to 60%, and even more preferably from 45% to 55% by weight with respect to the total weight of the entrained polymer. Optionally, channeling agent may be provided in a range of 2% to 15% by weight, optionally 2-12%, optionally 5-12%, optionally about 10%, optionally about 9%, optionally about 8%, optionally about 7%, optionally about 6%, optionally about 5%, optionally about 4%, optionally about 3%, optionally about 2%. Optionally, the base polymer may range from 10% to 60% by weight of the total composition, optionally from 20% to 45% by weight, optionally from 25% to 35% by weight. Optionally, a colorant is added, e.g., at about 0.5-2% or at about 1% by weight of the total composition. Combination of any of the above ranges with respect to the base polymer, active agent, channeling agent, and colorant is contemplated.

Referring to FIG. 1, an insert 20, constructed from an entrained polymer usable in the present invention is illustrated. The insert 20, as shown, is in the form of a plug 55 that may be deposited into a container. This plug form, while not the form contemplated for use in a blow molded bottle, is provided here to schematically illustrate the composition of a three phase entrained polymer material that is useable for the inner layer of a bottle.

Figure 2:
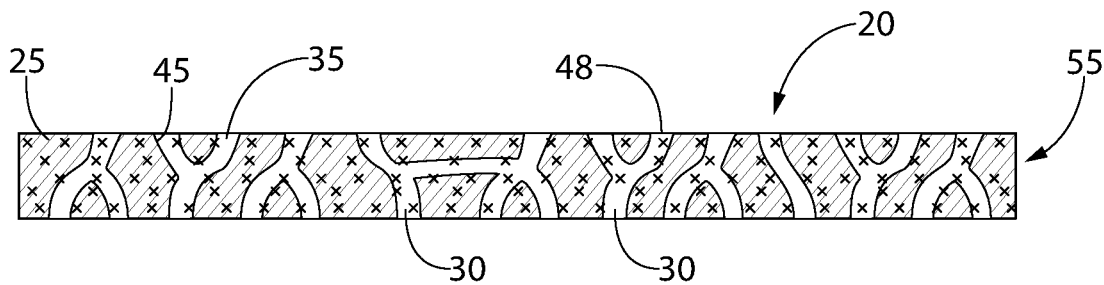
FIG. 2 is a cross section taken along line 2-2 of FIG. 1.

Referring to FIG. 2, a cross-sectional view is shown of the plug 55 that has been constructed from an entrained polymer 10 comprising the base polymer 25 that has been uniformly blended with the active agent 30 and the hydrophilic agent or channeling agent 35. In the illustration of FIG. 2, the entrained polymer has been solidified so that interconnecting channels 45 have formed throughout the entrained polymer 10 to establish passages throughout the solidified plug 55. As may be appreciated from both FIGS. 1 and 2, the passages terminate in channel openings 48 at exterior surfaces of the plug 55.

Figure 3:
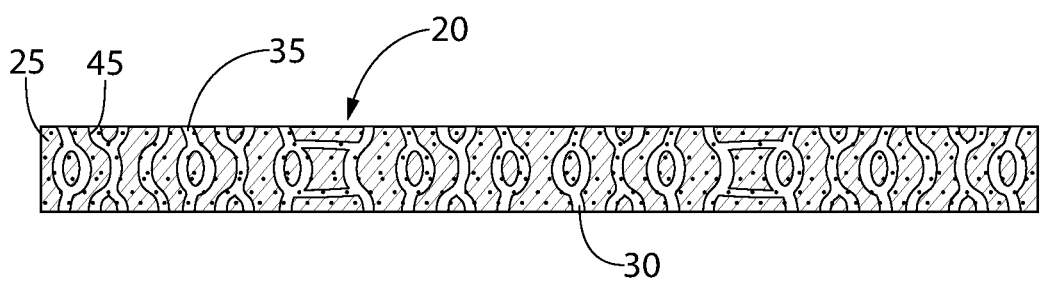
FIG. 3 is a cross section similar to that of FIG. 2, showing a plug formed of another embodiment of an entrained polymer according to an optional embodiment of the present invention.

FIG. 3 illustrates the embodiment of a plug 55 similar in construction and makeup to the plug 55 of FIG. 2, where interconnecting channels 45 are very fine compared to those of FIG. 2. This can result from the use of a dimer agent (i.e., a plasticizer) together with a channeling agent 35. The dimer agent may enhance the compatibility between the base polymer 25 and the channeling agent 35. This enhanced compatibility is facilitated by a lowered viscosity of the blend, which may promote a more thorough blending of the base polymer 25 and channeling agent 35, which under normal conditions can resist combination into a uniform solution. Upon solidification of the entrained polymer 10 having a dimer agent added thereto, the interconnecting channels 45 which are formed therethrough have a greater dispersion and a smaller porosity, thereby establishing a greater density of interconnecting channels throughout the plug 55.

Interconnecting channels 45, such as those disclosed herein, facilitate transmission of a desired material, such as moisture, gas or odor, through the base polymer 25, which generally resists permeation of these materials, thus acting as a barrier thereto. For this reason, the base polymer 25 itself acts as a barrier substance within which an active agent 30 may be entrained. The interconnecting channels 45 formed of the channeling agent 35 provide pathways for the desired material to move through the entrained polymer 10. Without these interconnecting channels 45, it is believed that relatively small quantities of the desired material would be transmitted through the base polymer 25 to or from the active agent 30. In the case in which the desired material is transmitted to the active agent 30, it may be absorbed by the active agent 30, for example in embodiments in which the active agent 30 is an active agent such as a desiccant or an oxygen absorber. In the case in which the desired material is transmitted from the active agent 30, it may be released from the active agent 30, for example in embodiments in which the active agent 30 is a releasing material, such as a fragrance or gas releasing material.

Figure 5:
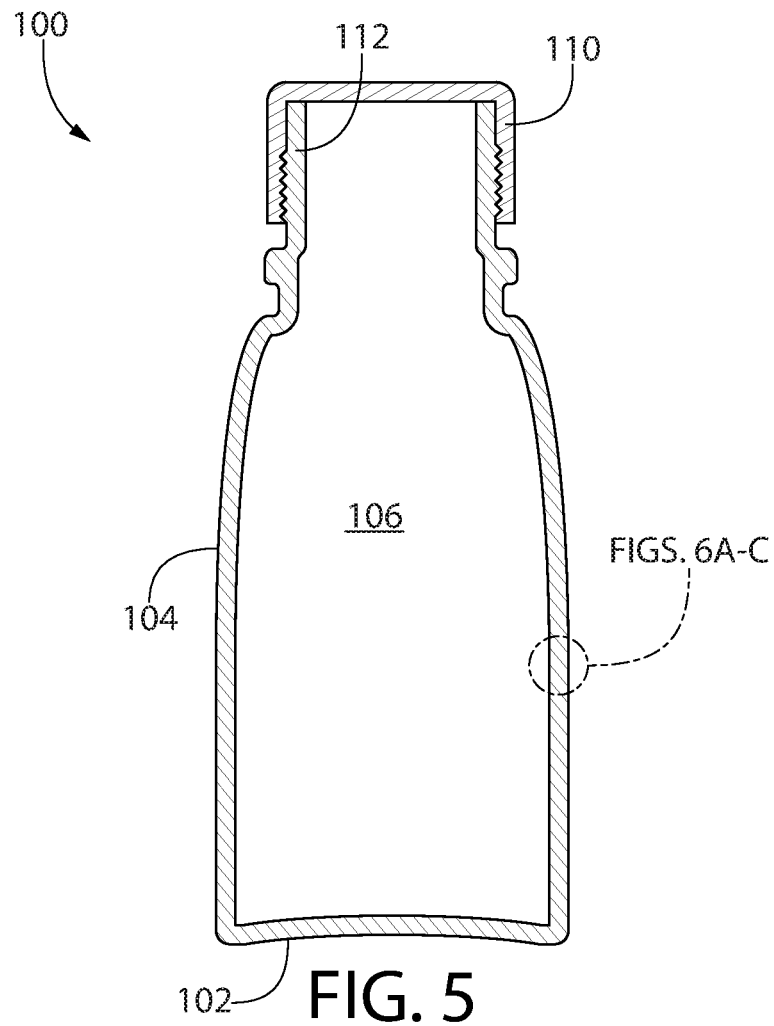
FIG. 5 is a simplified section view of a container (bottle) formed by a blow molding process, in accordance with one non-limiting embodiment of the disclosed concept.

FIG. 5 is a simplified section view of a container 100, e.g., a bottle, formed by a blow molding process, in accordance with one non-limiting embodiment of the disclosed concept. The illustrated container 100 includes a base 102 and a sidewall 104 extending from the base 102. The base 102 and the sidewall 104 define an interior 106 configured to house at least one product (e.g., without limitation, pills, powders and the like). The container 100 may also optionally include a lid 110 configured to be coupled to an open top portion 112 or neck of the sidewall 104, in order to enclose the product within the interior 106. In accordance with the disclosed concept, and as will be discussed below, the container 100 is formed by a blow molding process wherein the base 102 and/or the sidewall 104 are comprised of layers distinct from those in the existing prior art blow molded containers, which do not utilize channeling agents. As a result, the container 100, as compared to prior art blow molded containers, provides significant advantages in terms of moisture control, exposure to moisture absorbing substances, and/or efficiency in terms of manufacturing processes.

Figure 6A:
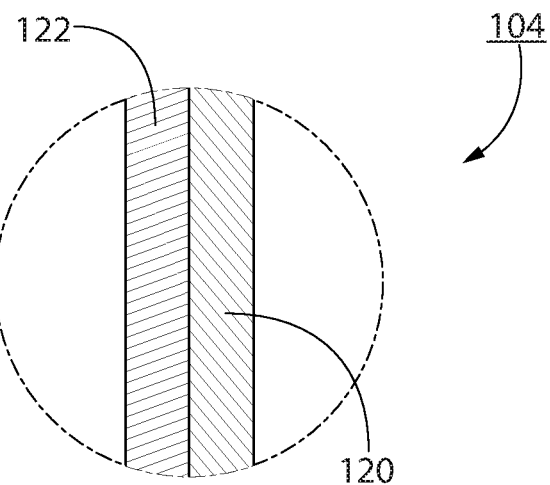
FIGS. 6A-6C are different enlarged section views of the sidewall of the container of FIG. 5, each corresponding to an alternative embodiment in which the container may be implemented.

FIG. 6A illustrates an enlarged view, corresponding to a first optional embodiment in which the container of FIG. 5 may be implemented. As shown, the sidewall 104 generally has a barrier layer 120 and a desiccant layer 122 attached to the barrier layer 120. The barrier layer 120 and the desiccant layer 122 are each blow molded together, with the barrier layer 120 being located external relative to the desiccant layer 122. The barrier layer 120 is made of any suitable plastic material. In accordance with the disclosed concept, the desiccant layer 122 may be made of a monolithic composition comprising a mixture of a base polymer, a desiccant, and a channeling agent. As will be more apparent below with reference to FIGS. 7 and 8, the desiccant layer 122, distinct from moisture absorbing materials and/or layers of prior art containers, which do not utilize channeling agents, provides significant unexpected results in terms of moisture absorption within the interior 106.

In one optional embodiment, the desiccant layer 122 has a thickness of between 25 and 35 mils, preferably being about 0.8 millimeters. In one optional embodiment, the desiccant layer 122 includes 30% to 80% molecular sieve. In one optional embodiment, the channeling agent of the desiccant layer 122 is by weight between 5% and 10% of the monolithic composition. In one optional embodiment, the desiccant layer 122 has a porous structure. In one optional embodiment, the barrier layer 120 has a non-porous structure. In one optional embodiment, the desiccant of the desiccant layer 122 is calcium oxide. In one optional embodiment, a ratio of the desiccant to the base polymer is approximately 75 parts by weight of the desiccant to 20 parts by weight of the base polymer. Although the first embodiment of FIG. 6A has been described in association with the sidewall 104 (including the neck 112), it will be appreciated that the base 102 may also have barrier and desiccant layers substantially the same as the barrier and desiccant layers 120,122, respectively, in accordance with the disclosed concept. That is, barrier and desiccant layers of the base 102 may be contiguous with the barrier layer 120 and the desiccant layer 122 of the sidewall 104.

Figure 6B:
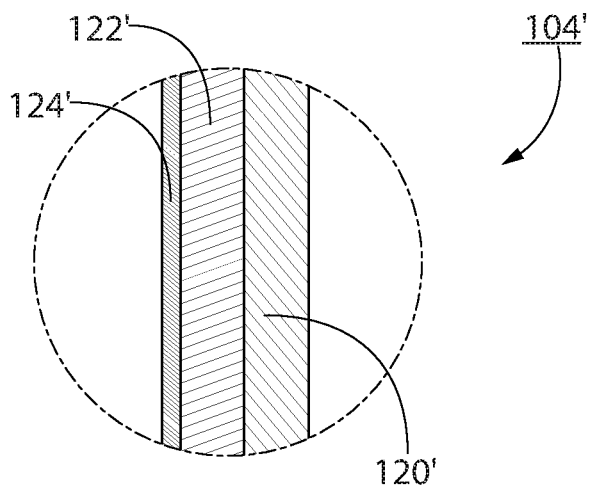

FIG. 6B illustrates an enlarged view, corresponding to a second optional embodiment in which the container of FIG. 5 may be implemented. As shown, in addition to the barrier layer 120' and the desiccant layer 122', the sidewall 104' further includes a relatively thin skin layer 124' attached to the desiccant layer 122'. The barrier layer 120', the desiccant layer 122', and the skin layer 124' are each preferably blow molded together (e.g., from a coextruded composite material), and as shown, the desiccant layer 122' and the barrier layer 120' are each respectively located external relative to the skin layer 124'. In one example embodiment, the skin layer 124' is made of a plastic material, optionally a low density polyethylene material. It will be appreciated that the skin layer 124' advantageously functions to minimize the likelihood that desiccant particles from the desiccant layer 122' will enter the interior 106 (FIG. 5) of the container 100 (FIG. 5). Furthermore, the skin layer 124' is able to achieve this function without significantly compromising the moisture absorbing capabilities of the desiccant layer 122'. That is, even though the skin layer 124' is between the desiccant layer 122' and the interior 106 (FIG. 5) of the container 100 (FIG. 5), the desiccant layer 122' is still able to adequately absorb moisture. In one optional embodiment, the skin layer 124' has a thickness of from 0.005 mm to 0.1 mm, optionally from 0.005 mm to 0.05 mm, optionally about 0.01 mm.

Figure 6C:
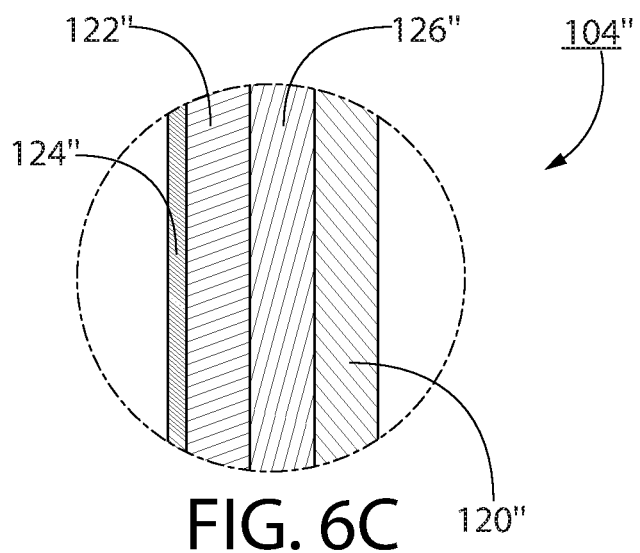

FIG. 6C illustrates an enlarged view, corresponding to a third optional embodiment in which the container of FIG. 5 may be implemented, where like reference numerals illustrate like components. As shown, in addition to the barrier layer 120", the desiccant layer 122", and the skin layer 124", the sidewall 104" further has an intermediate layer 126" located between the barrier layer 120" and the desiccant layer 122". In one optional embodiment, the intermediate layer 126" is made of a monolithic composition including a plastic material and a mixture of a base polymer, a desiccant, and a channeling agent. Stated differently, the intermediate layer 126" may be a monolithic composition comprising, for example, recycled portions of the sidewall 104 of the first embodiment depicted in FIG. 6A. As such, it will be appreciated that material of the sidewall 104 that is reground can be re-used in another container, for example a container containing the sidewall 104". This provides advantages in terms of reducing waste. That is, as compared to prior art containers and methods of making the same that from time to time discard containers (e.g., without limitation, containers that may have been warped during manufacturing), the container 100 including the sidewall 104" advantageously recycles such material while still providing for significant improvements in terms of moisture absorption.

It will be appreciated that a method of manufacturing the container 100 (FIG. 5) includes the steps of providing a stock component, inserting an apparatus into an opening in the stock component, and passing air into the opening of the stock component in order to form the container 100.

Optionally, in any embodiment, the container 100 may have a total wall thickness of from 10 to 80 mils, optionally from 20 to 60 mils, optionally from 20 to 40 mils. The container 100 may be even thicker than 80 mils for some applications. In one optional embodiment, the container 100 includes a 20-40 mil thick wall and/or a 20-40 mil thick desiccant layer. In another optional embodiment, the container 100 includes a 20 mil barrier layer and a 20 mil desiccant entrained polymer layer. The barrier layer material is not particularly limited. For example, HDPE, LDPE, PE or any non-moisture permeable material may be used.

Figure 7:
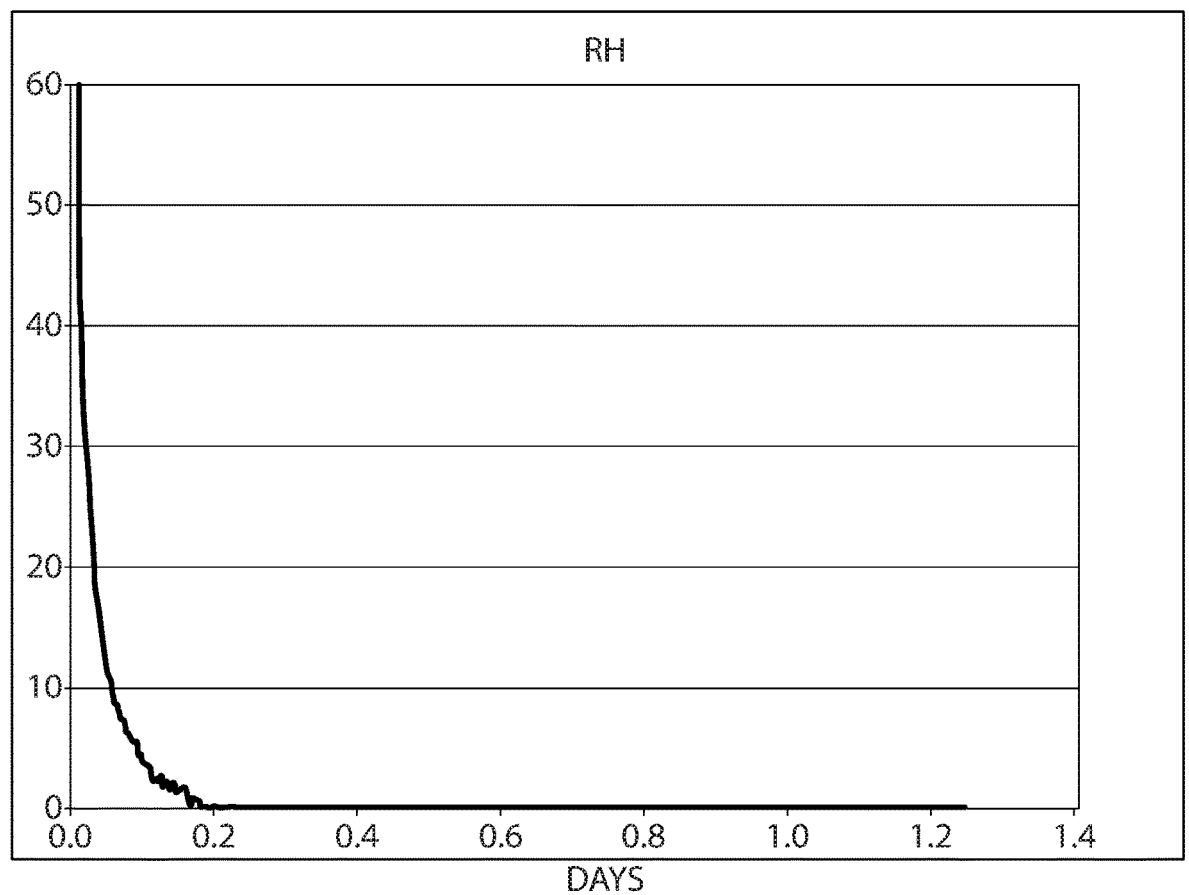
FIG. 7 is a graph illustrating the relative humidity control of the desiccant layer of FIG. 6A versus time in the container, in accordance with the disclosed concept.

FIG. 7 shows a graph illustrating the relative humidity control (which is shown in percent relative humidity on the Y axis of the graph) of the desiccant layer 122 of FIG. 6A versus time in the container 100, in accordance with an optional aspect of the disclosed concept. The desiccant used in this embodiment was molecular sieve and a channeling agent was also used in the desiccant layer (i.e., it was a three phase composition). As shown, after approximately 0.2 days after initial closure, the relative humidity in the container 100, dropped from over 60% to about zero and remained there—an impressive result. Additional information about this data is provided below, in Example 1.

Figure 8:
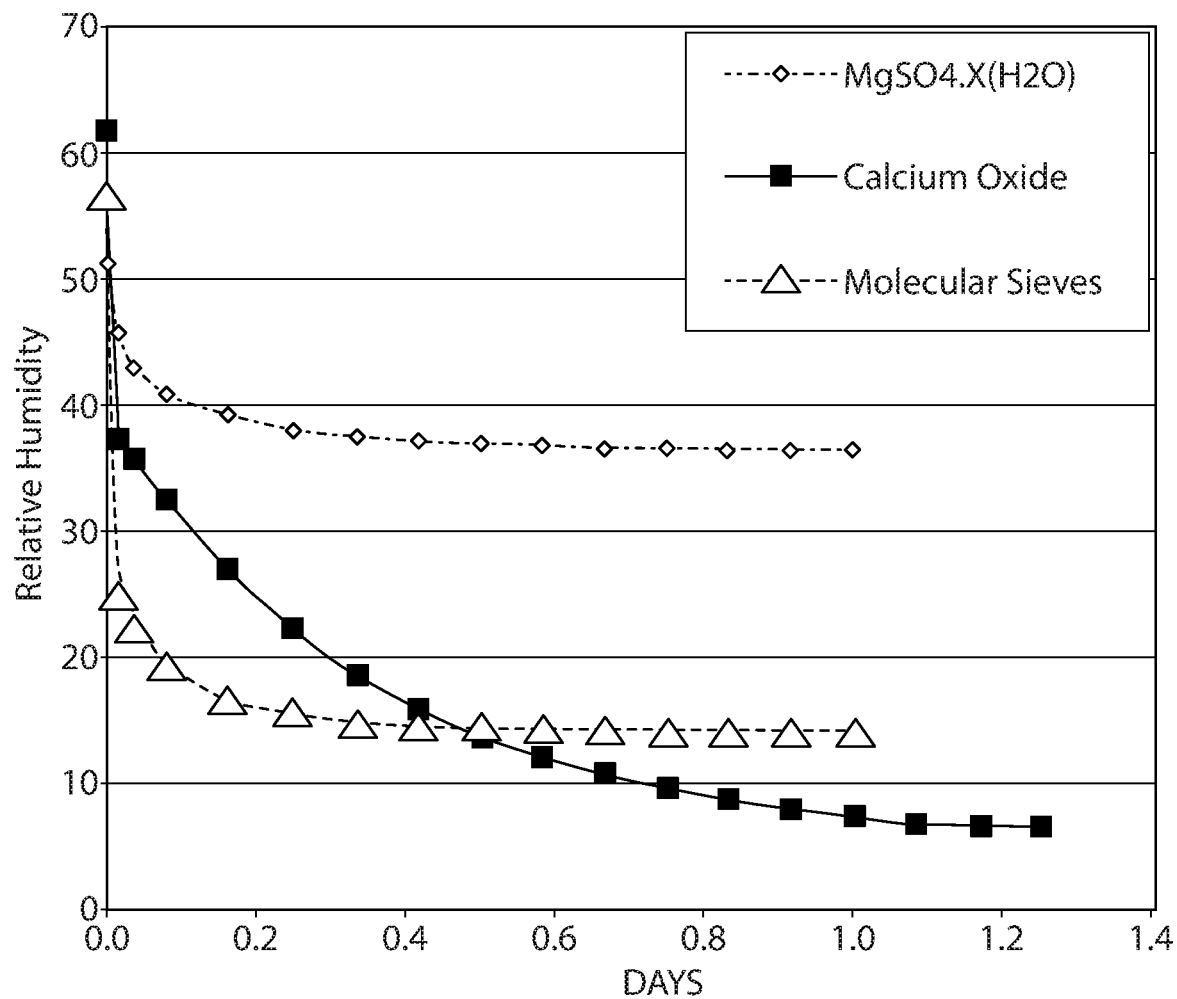
FIG. 8 is a graph illustrating the relative humidity control by various desiccants versus time of a prior art container.

FIG. 8 shows a graph illustrating the relative humidity control of a desiccant layer versus time of a prior art blow molded container (described in U.S. Pat. No. 8,110,260) having a desiccant entrained polymer layer. The desiccant layer of the prior art container included molecular sieve and was devoid of a channeling agent, using a blowing agent instead. As shown in FIG. 8, after approximately 0.2 days after initial closure, the relative humidity in the prior art container (having a molecular sieve desiccant layer), was about 13% to about 15%.

Accordingly, it can be appreciated that the novel blow molded container 100 in accordance with the disclosed concept achieved significant unexpected results. Specifically, blow molding the container 100 with the desiccant layer 122 comprising a base polymer, desiccant and channeling agent, as opposed to prior art methods devoid of channeling agents, provides significant moisture absorption advantages, as appreciated with reference to FIGS. 7 and 8.

Achieving proper melt flow during extrusion and blow molding can be difficult because granular desiccants (e.g., molecular sieve) can significantly slow down flow. Optionally, in a process for making any embodiment disclosed herein, the process conditions should be such that a melt flow index of from 0.5 to 2, optionally from 1 to 2 (ISO 1133-1).

While the disclosed concept has been described in association with the three examples of FIGS. 6A-6C, it will be appreciated that suitable alternatives are contemplated herein. That is, sidewalls and/or bases of containers in accordance with the disclosed concept may have one or more barrier, desiccant, skin, intermediate, and/or alternative layers, without departing from the scope of the disclosed concept.

In yet another alternative embodiment of the disclosed concept, a blow molded bottle is provided, comprising or consisting essentially of a single layer of desiccant entrained polymer or single layer of regrind (e.g., 50% desiccant entrained polymer and 50% virgin polypropylene or HDPE, for example). Such an embodiment would need to be stored (at least prior to use by a consumer) in secondary packaging that provides a barrier to moisture, e.g., a foil pouch. The desiccant entrained polymer in this embodiment would include a base polymer, desiccant and channeling agent (i.e., comprise a three phase composition).

Various aspects of the invention will be illustrated in more detail with reference to the following Examples, but it should be understood that the present invention is not deemed to be limited thereto.

EXAMPLES

Blow molded bottles 100 (150 mL) in accordance with FIGS. 5 and 6A were prepared using the formulations in Table 1 below as the desiccant layer 122 (20-40 mil) and HDPE as the barrier layer 120 (20-40 mil).

TABLE 1

Formulation for desiccant layer.

| Sample | Base Polymer | Desiccant | Channeling Agent | Colorant |
|---|---|---|---|---|
| 1 | LDPE (29%) | Molecular Sieves (60%) | EVA (10%) | 1% |
| 2 | LDPE (34%) | Molecular Sieves (60%) | EVA (5%) | 1% |
| 3 | LDPE (39%) | Molecular Sieves (50%) | EVA (10%) | 1% |
| 4 | LDPE (44%) | Molecular Sieves (50%) | EVA (5%) | 1% |

The change in relative humidity inside the bottles was measured. Data from Sample 2 are graphed in FIG. 7. Sample 2 was exposed to 80% relative humidity at 30° C. and was allowed to reach equilibrium. The bottle was then sealed and the humidity level inside was monitored over a period of about 26 hours.

While the disclosed concept has been described in detail and with reference to specific examples thereof, it will be apparent to one skilled in the art that various changes and modifications can be made therein without departing from the spirit and scope thereof.

What is claimed is:

1. A method of manufacturing a bottle, the bottle comprising a base, a sidewall extending from the base, and a neck extending from the sidewall, the neck leading to a dispensing opening, the base and the sidewall defining an interior configured to house at least one product, the neck having a first cross sectional area and the sidewall having a second cross sectional area, the first cross sectional area being smaller than the second cross sectional area, the method comprising the steps of:

providing a stock component comprising a coextruded composite having a barrier layer and a desiccant layer;

inserting an apparatus into an opening in the stock component; and passing air into the opening of the stock component in order to form the bottle from the stock component, wherein the sidewall, the neck and the base include the barrier layer and the desiccant layer coextruded with and thereby attached to the barrier layer, the barrier layer and the desiccant layer each being blow molded together and contiguous with each other along the sidewall, the neck and the base, the barrier layer being disposed external relative to the desiccant layer and being made of a plastic material, the desiccant layer being made of a monolithic composition comprising a mixture of a base polymer, a desiccant comprising 35% to 70% by weight with respect to the total weight of the monolithic composition, and a polymeric channeling agent having a water vapor transmission rate greater than the base polymer chosen from polyglycol, ethylene-vinyl alcohol (EVOH), polyvinyl alcohol (PVOH), glycerin polyamine, polyurethane, polycarboxylic acid, propylene oxide polymerisate-monobutyl ether, propylene oxide polymerisate, ethylene vinyl acetate (EVA), nylon 6, nylon 66, or any combination of the foregoing, the monolithic composition comprising interconnecting channels formed of the channeling agent.

2. The method of claim 1, wherein each of the barrier layer and the desiccant layer has a thickness of from 20 to 40 mils.

3. The method of claim 1, wherein the desiccant layer comprises molecular sieve.

4. The method of claim 1, wherein the polymeric channeling agent is ethylene vinyl acetate (EVA).

5. The method of claim 1, wherein the desiccant layer comprises channeling agent in an amount of 2% to 15% by weight with respect to total weight of the monolithic composition.

6. The method of claim 1, wherein each of the barrier layer and the desiccant layer has a thickness of from 20 to 40 mils and the desiccant layer comprises molecular sieve as the desiccant.

7. The method of claim 1, wherein the bottle has a total wall thickness of from 10 to 80 mils.

* * * * *